United States Patent [19]

Bowman et al.

[11] Patent Number: 5,642,901

[45] Date of Patent: Jul. 1, 1997

[54] THERMOPLASTIC AIR BAG COVER HAVING A MEMBRANE SWITCH WITH ENHANCED ACTIVATION

[75] Inventors: David A. Bowman, Shelby Township; David J. Davis, Troy, both of Mich.

[73] Assignee: Larry J. Winget, Leonard, Mich.

[21] Appl. No.: 509,993

[22] Filed: Aug. 1, 1995

Related U.S. Application Data

[63] Continuation-in-part of Ser. No. 451,452, May 26, 1995, Pat. No. 5,542,694, and a continuation-in-part of Ser. No. 451,458, May 26, 1995, abandoned.

[51] Int. Cl.$^6$ ..................................................... B60R 21/20
[52] U.S. Cl. ................... 280/728.3; 280/731; 200/61.54
[58] Field of Search ......................... 280/731, 728.3, 280/728.1; 200/61.54, 61.55, 61.56, 61.57

[56] References Cited

U.S. PATENT DOCUMENTS

| | | | |
|---|---|---|---|
| 4,325,568 | 4/1982 | Clark et al. | 280/731 |
| 4,934,735 | 6/1990 | Embach | 280/731 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,198,629 | 3/1993 | Hayashi et al. | 280/731 |
| 5,308,106 | 5/1994 | Heidorn | 280/728.3 |
| 5,344,185 | 9/1994 | Cooke, II | 280/731 |
| 5,369,232 | 11/1994 | Leonelli | 280/731 |
| 5,371,333 | 12/1994 | Kanai et al. | 280/731 |
| 5,399,819 | 3/1995 | Lang et al. | 280/731 |
| 5,413,376 | 5/1995 | Filion et al. | 280/731 |
| 5,465,998 | 11/1995 | Davis | 200/61.54 |
| 5,499,841 | 3/1996 | Trojan et al. | 280/731 |
| 5,520,412 | 5/1996 | Davis | 280/731 |

FOREIGN PATENT DOCUMENTS

| | | | |
|---|---|---|---|
| 0669229 | 8/1995 | European Pat. Off. | |
| 3427771 | 2/1986 | Germany . | |
| 4034539 | 5/1991 | Germany . | |
| 4317737 | 12/1993 | Germany . | |
| 4410041 | 9/1994 | Germany . | |
| 5-330394 | 12/1993 | Japan | 280/731 |
| 2248723 | 4/1992 | United Kingdom . | |

*Primary Examiner*—Brian L. Johnson
*Assistant Examiner*—Peter C. English
*Attorney, Agent, or Firm*—Brooks & Kushman P.C.

[57] ABSTRACT

A relatively flexible thermoplastic air bag cover is provided including a front panel wherein switch activating members enhance activation of a membrane-type switch located at a switch location area of the front panel. This feature provides pressure points which enhance activation of the membrane-type switch. The switch activating members are located on the rear inner surface of the cover in one embodiment and, in another embodiment, on the upper surface of a back plate which provides a hollow compartment for the switch. The switch activating members can be integrally formed in the shape of small circles, ribs, raised dots, X's, etc.

11 Claims, 5 Drawing Sheets

THERMOPLASTIC AIR BAG COVER HAVING A MEMBRANE SWITCH WITH ENHANCED ACTIVATION

CROSS-REFERENCE TO RELATED APPLICATIONS

This application is a continuation-in-part of U.S. application Ser. No. 08/451,452, filed May 26, 1995, U.S. Pat. No. 5,542,694 and a continuation-in-part of U.S. application Ser. No. 08/451,458, filed May 26, 1995, abandoned.

This application is also related to U.S. application Ser. No. 08/407,925, filed Mar. 21, 1995 and U.S. application Ser. No. 08/458,882, filed Jun. 2, 1995, now U.S. Pat. No. 5,520,412.

TECHNICAL FIELD

This invention relates to plastic air bag covers having switch assemblies therein and, in particular, to such covers which are affixable to air bag containers.

BACKGROUND ART

Presently, when air bag covers are provided in an automobile, the air bag is stored in a steering wheel, in a seat bottom side or seat back side or door panel, or in an instrument panel of the vehicle. During automatic inflation of the driver's side air bag, at least a portion of the air bag cover moves away from the steering column to permit the air bag to perform its safety function between the steering column and the operator of the vehicle.

A recent practice in the automotive industry is utilization of all plastic fabricated air bag covers. Conventional air bag covers used in conjunction with occupant restraint systems often include various connection systems for attaching the air bag cover to the uninflated air bag container.

U.S. Pat. No. 4,325,568 issued to Clark et al. discloses a modular occupant restraint system including an inflator, a cushion, a container for the cushion and an air bag cover for the container assembled as a module. Clark et al. utilizes a two piece air bag cover construction.

U.S. Pat. No. 5,085,462 issued to Gaultier discloses an air bag and vehicle horn switch assembly. Gaultier also discloses a conventional two piece cover construction.

U.S. Pat. No. 5,186,490 issued to Adams et al. discloses a cover for an inflatable restraint system for a motor vehicle which contains a slot in the upper wall thereof into which a replaceable thin or membrane type switch assembly in inserted. Adams et al. further discloses an air bag cover having an injection molded thermoplastic upper wall and a soft outer cover exposed to the interior of the vehicle manufactured from urethane, vinyl or polyester. The outer cover completely encompasses and overlaps the upper wall structure and an uninflated air bag forming two structures the air bag must exit to carry out its function.

The U.S. Pat. No. 4,934,735, to Embach, discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The U.S. Pat. No. 5,308,106, to Heidorn, discloses an air bag module cover assembly with a switch subassembly removably attached at a front surface of the assembly.

The U.S. Pat. No. 5,062,661, to Winget, discloses a rigid plate attached to the substantially rigid remainder of a front panel of an air bag cover to define a hollow compartment which together move upon manual actuation of a flexible, manually operable diaphragm at the front surface of the front panel. Upon separation from the side panel, the front panel, including the diaphragm, the hollow compartment and a rigid plate move together to permit the inflating air bag to leave the cover. The front panel has a first electrically conductive inner surface for making a circuit path with a corresponding second electrically conductive inner surface of the rigid plate.

The U.S. Pat. No. 5,344,185, to Cooke, II, discloses an air bag cover having a replaceable horn switch and a removable cover band.

The U.S. Pat. No. 5,369,232 to Leonelli discloses a membrane horn blow switch integrated into the front panel of an air bag cover. More specifically, the membrane switch seats in and fills a horn actuation area which is a step-down portion of the cover reduced in thickness to approximately 1.0–2.0 mm. The thinning of this "horn actuation area" is said to increase the flexibility of the cover. The horn actuation area is bounded at its vertical extremes by posts which project rearwardly from the inner surface of the cover. The "normal thickness" of the front wall of the cover is on the order of 2.5–3.0 mm. The portion of the cover occupied by the actuation area appears to be substantially less than 50% of the surface area of the front panel of the cover.

Some of the above switches are relatively small and oftentimes inaccessible for drivers who have large hands or for drivers who have limited manual dexterity. Many of the above switches are difficult to actuate and require a relatively large amount of pressure on the outer surface of the cover to close the membrane-type switch.

DISCLOSURE OF THE INVENTION

An object of the present invention is to provide an air bag cover having a membrane-type switch incorporated therein which is easily actuable over a relatively large surface area of the air bag cover.

In carrying out the above object and other objects of the present invention a relatively flexible thermoplastic air bag cover is provided. The air bag cover includes a front panel adapted to overlie an undeployed air bag. The front panel has a front outer surface and a rear inner surface and is separable along a prescribed tear pattern upon deployment of the air bag. The front panel has a switch location area. The air bag cover also includes a membrane-type switch lying behind the rear inner surface in the switch location area of the front panel. The membrane-type switch has a first plurality of spaced, individual switch activation locations. A back plate having a top surface and a bottom surface is secured to the rear inner surface of the front panel in containing relationship to the membrane-type switch to form a hollow compartment for the membrane-type switch in the switch location area. The air bag cover finally includes a second plurality of switch activating members integrally formed at and projecting from one of the rear inner surface of the front panel and the top surface of the back plate at the switch activation locations. The membrane-type switch is activated by depression of the front panel at its front outer surface in the switch location area. At least one of the switch actuation members enhances activation of the membrane-type switch at its respective switch activation location.

The advantages accruing to the air bag cover as constructed above are numerous. For example, the switch activating members provide pressure points to enhance activation of the membrane-type switch. The switch activating members can be located on the inside surface of the cover or on the switch side of the back plate. The switch activating members can be integrally formed in the shape of small circles, ribs, raised dots, X's, etc.

These and other features and additional objects of the invention will occur to those skilled in the art on reading the following description with reference to the accompanying drawings.

BEST MODE FOR CARRYING OUT THE INVENTION

Figure 1:
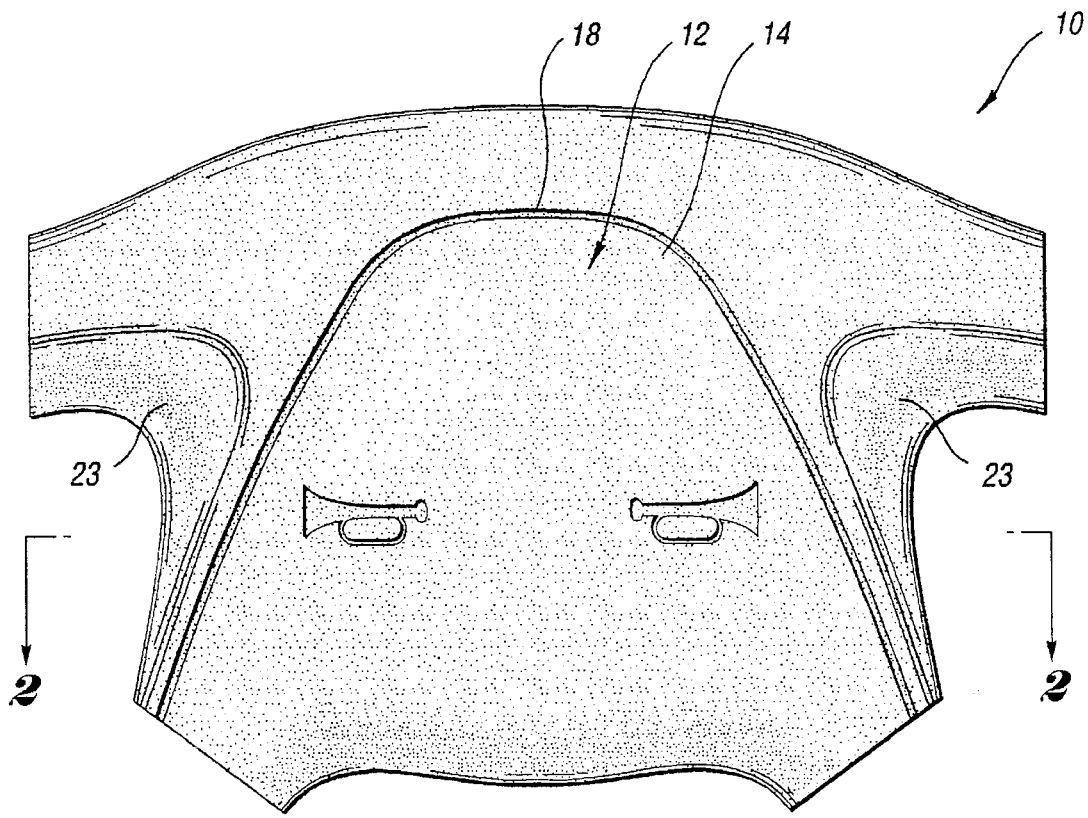
FIG. 1 is a front elevational view of an air bag cover constructed in accordance with the present invention.
Figure 2:
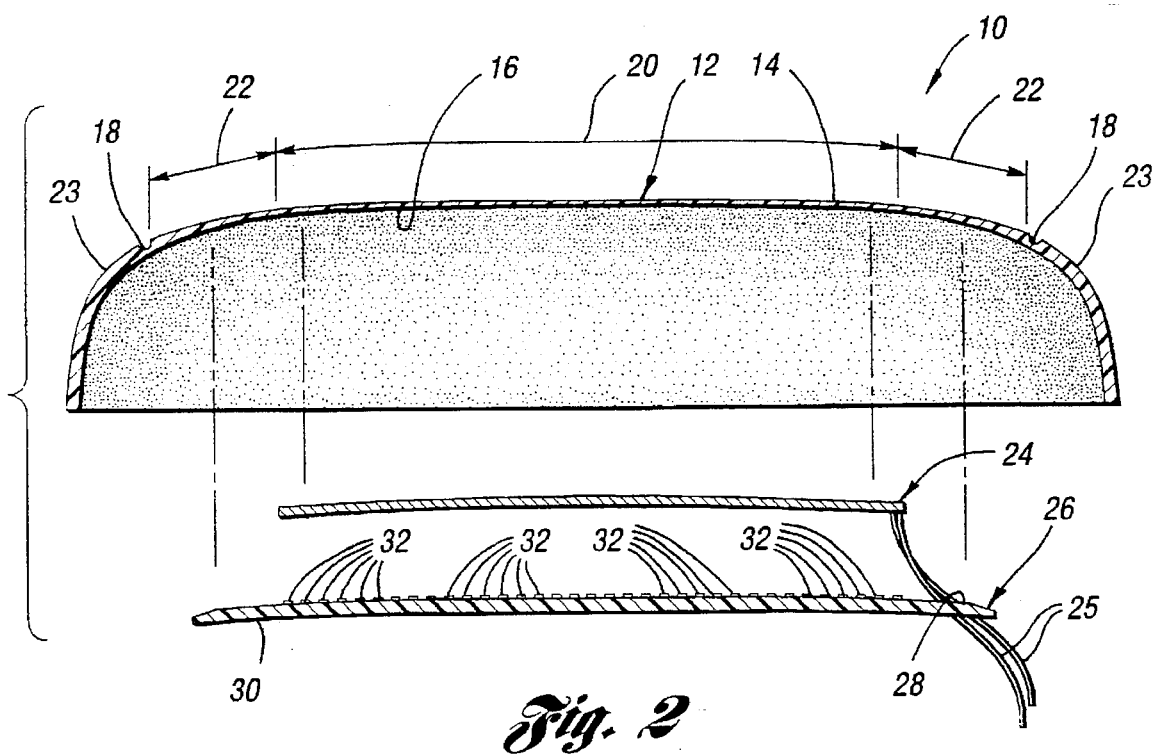
FIG. 2 is a sectional, exploded view of the air bag cover of FIG. 1, taken along lines 2—2 of FIG. 1.
Figure 3:
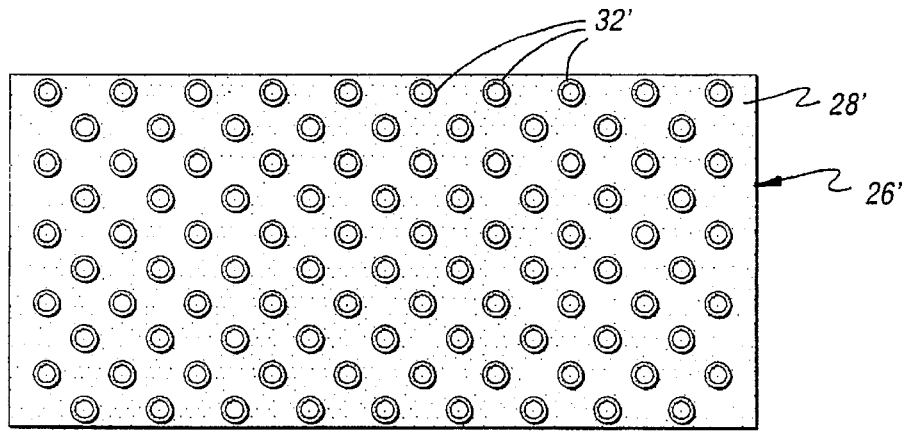
FIG. 3 is a top plan view of another back plate.
Figure 4:
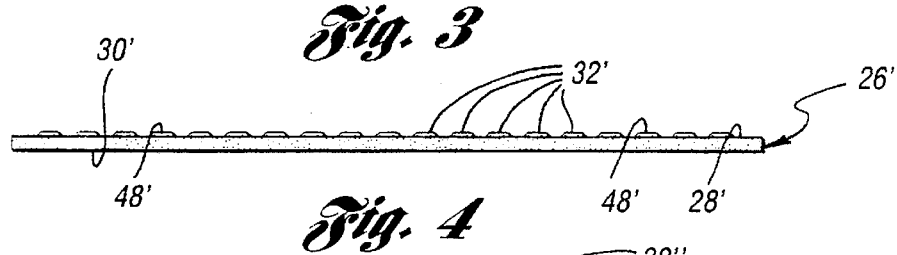
FIG. 4 is a side elevational view of the back plate of FIG. 3.
Figure 5:
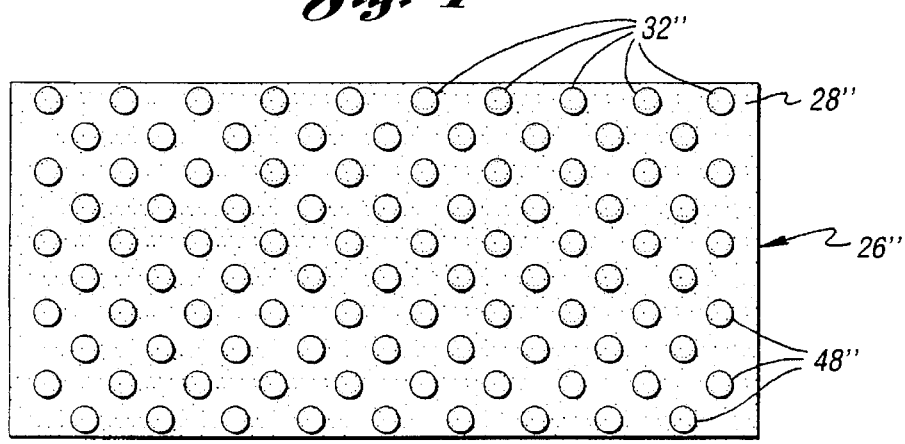
FIG. 5 is a top plan view of yet another embodiment of the back plate.
Figure 6:
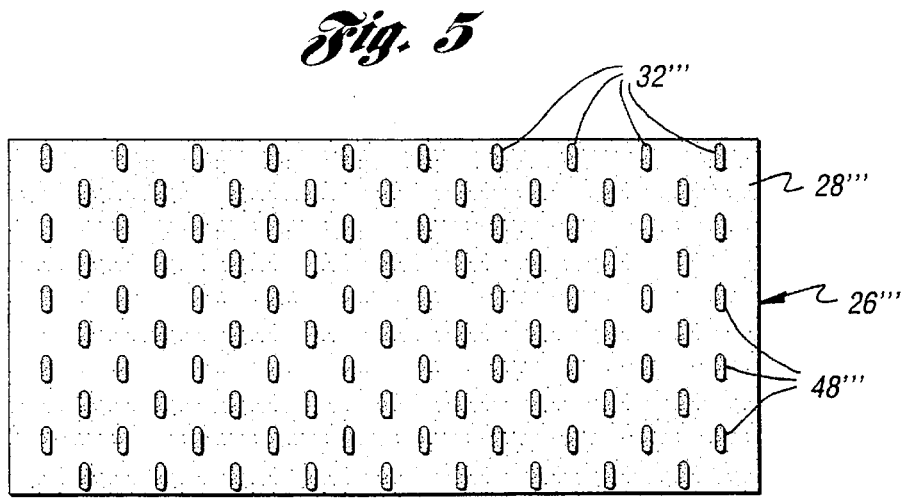
FIG. 6 is a top plan view of a fourth embodiment of the back plate.
Figure 7:
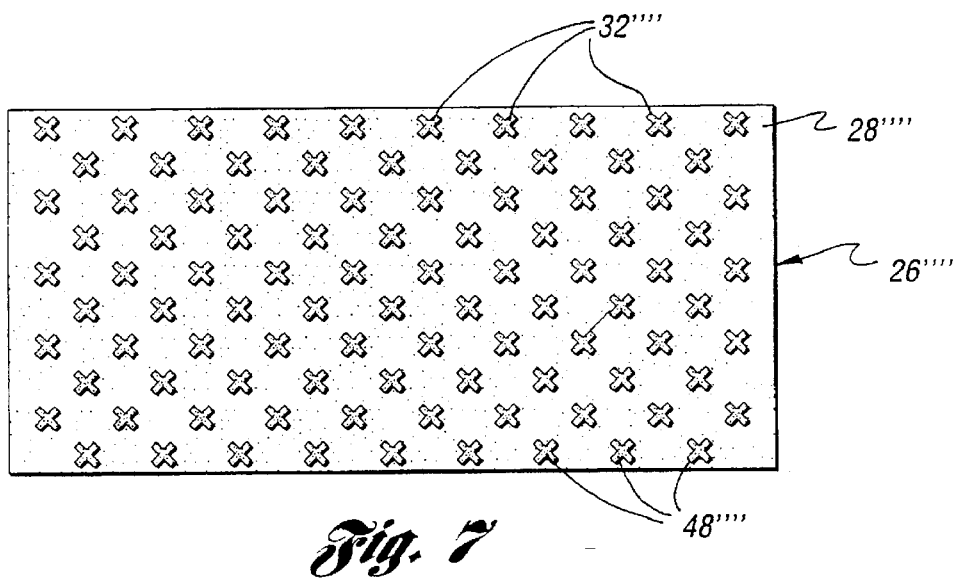
FIG. 7 is a top plan view of a fifth embodiment of the back plate.

Referring now to the drawing Figures, there is illustrated in FIGS. 1 and 2 an automotive air bag cover, generally indicated at 10, constructed in accordance with the present invention. Typically, the automotive air bag cover is adapted to be secured at the top end of the vehicle drive column (not shown) at the steering wheel of the vehicle.

The air bag cover 10 is preferably a relatively flexible thermoplastic air bag cover formed by injection molding with a thermoplastic such as Santoprene (a trademark of Monsanto Company).

The air bag cover 10 includes a front panel 12 overlying an undeployed air bag (not shown). The front panel 12 has a front outer surface 14 and a rear inner surface 16.

The front panel is separable along a prescribed tear pattern 18 upon deployment of the air bag. The front panel 12 includes a switch location area 20 in the range of 1.0–2.2 mm in thickness.

The air bag cover 10 also includes a membrane-type switch, schematically illustrated at 24 in FIG. 2, which lies behind the rear inner surface of the front panel 12 in the switch location area 20. The switch 24 includes electrical leads 25 adapted to be electrically connected to the vehicle's electrical system. The membrane-type switch 24 is illustrated in detail in FIGS. 8 and 9.

The air bag cover also includes a plastic or non-plastic back plate, generally indicated at 26, which is secured by being thermally bonded to the rear inner surface 16 of the front panel 12 in containing relation to the membrane-type switch 24 to form a hollow compartment for the switch 24.

As illustrated in FIG. 2, and in detail in the above-noted application No. 08/458,882, entitled "Thermoplastic Air Bag Cover Having A Membrane Switch", a border area 22 of the front panel 12 gradually and continuously decreases in thickness from its outer edge portion to the switch location area 20 between the rear inner surface 16 and the front outer surface 14. Consequently, the border area 22 and the switch location area 20 are together thinned relative to the nominal wall thickness of curved side walls 23 (i.e., typically 3 mm–4 mm) of the air bag cover 10.

The back plate 26 has a top surface 28 and a bottom surface 30. The back plate 26 has a plurality of switch activating members 32 which are integrally formed at and project upward from the top surface 28 of the back plate 26. The switch activating members 32 enhance activation of the membrane-type switch 24 by providing pressure points.

It is to be understood that the switch activating members 32 can alternatively be integrally formed at and project downward from the rear inner surface 16 of the front panel 12.

Referring now to FIGS. 3–7, there are illustrated various alternative embodiments of back plates, generally indicated at 26', 26" 26''' and 26'''', wherein each embodiment of the back plate has the same reference numeral (i.e., 26) as the embodiment of FIG. 2 but a different prime designation. The back plate 26' has a bottom surface 30'. As illustrated in FIGS. 3–7, switch activating members 32', 32", 32''' and 32'''' are integrally and uniformly formed at their respective top surfaces 28', 28", 28''' and 28'''' in the shape of small circles, raised dots, ribs and X's, respectively. Obviously, other types of raised features may also be employed.

Figure 8:
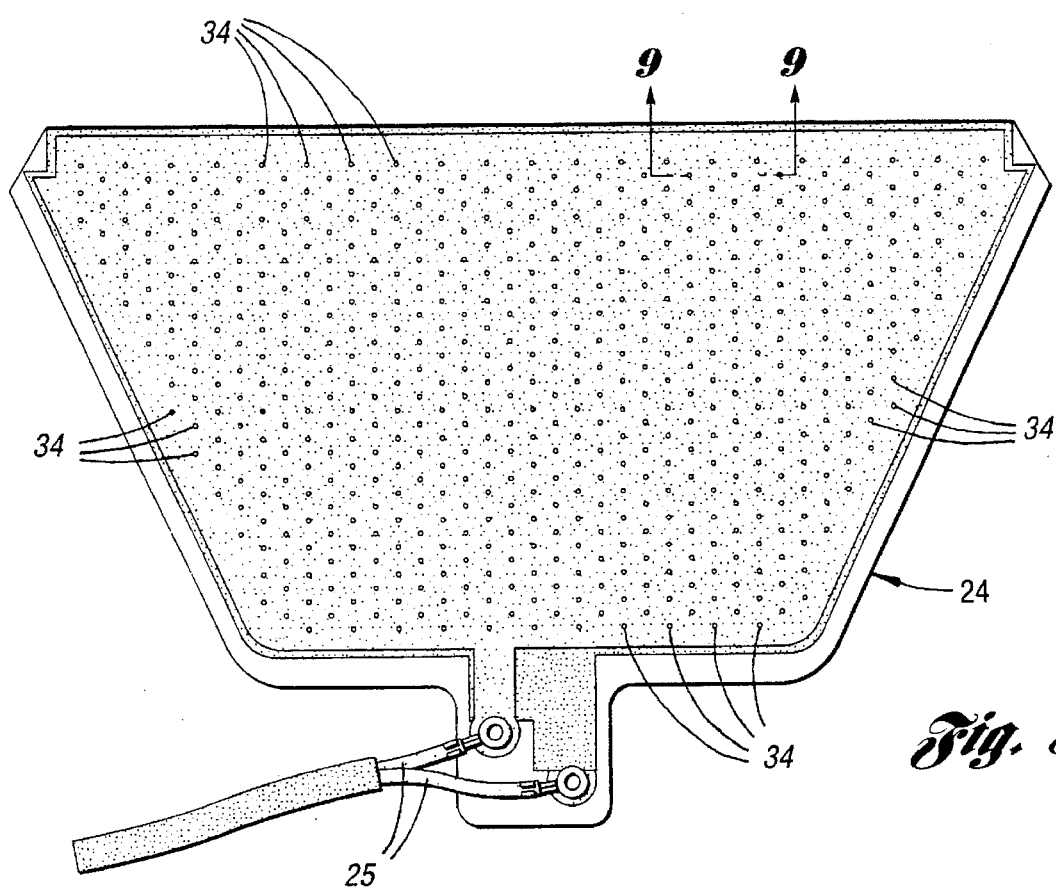
FIG. 8 is a top plan view, partially broken away, of a membrane-type switch of FIG. 2.
Figure 9:
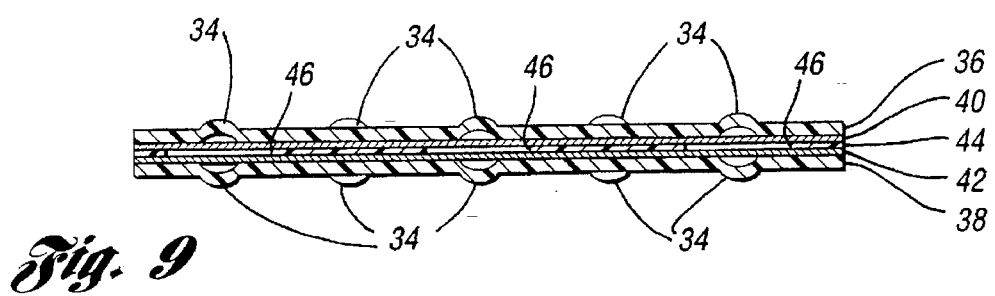
FIG. 9 is an enlarged sectional view, partially broken away, taken along lines 9—9 of FIG. 8.

Referring now to FIGS. 8 and 9, there is illustrated in detail a preferred membrane-type switch 24 which has a plurality of spaced, individual switch activation locations defined by respective raised domes 34, as best shown in FIG. 9. The switch 24 includes top and bottom surface layers 36 and 38, respectively, and intermediate first and second conductive layers 40 and 42, respectively, separated by an insulating layer 44 having apertures 46 formed completely therethrough. The raised domes 34 are integrally formed in both the top and bottom surface layers 36 and 38 adjacent the apertures 46 in the insulating layer 44 to define the switch activation locations.

Distal end surfaces 48', 48", 48''' and 48'''' of the switch activating members 32', 32", 32''', and 32'''', respectively, engage and depress at least one of the raised domes 34 upon depression of the front panel 12 at its outer surface 14. The at least one depressed dome causes its respective conductive layer 40 or 42 to engage the other conductive layer 42 or 40 to make electrical contact within its respective aperture 46.

The switch activating members 32, 32', 32", 32''' and 32'''' are uniformly spaced and their respective distal end surfaces 48', 48", 48''' and 48'''' are sized so that each switch activating member 32, 32', 32", 32''' and 32'''' is capable of engaging and depressing at least one of the raised domes 34 upon depression of the front panel 12. Preferably, the switch 24 is available from the Bergquist Company of Edina, Minn.

Figure 10:
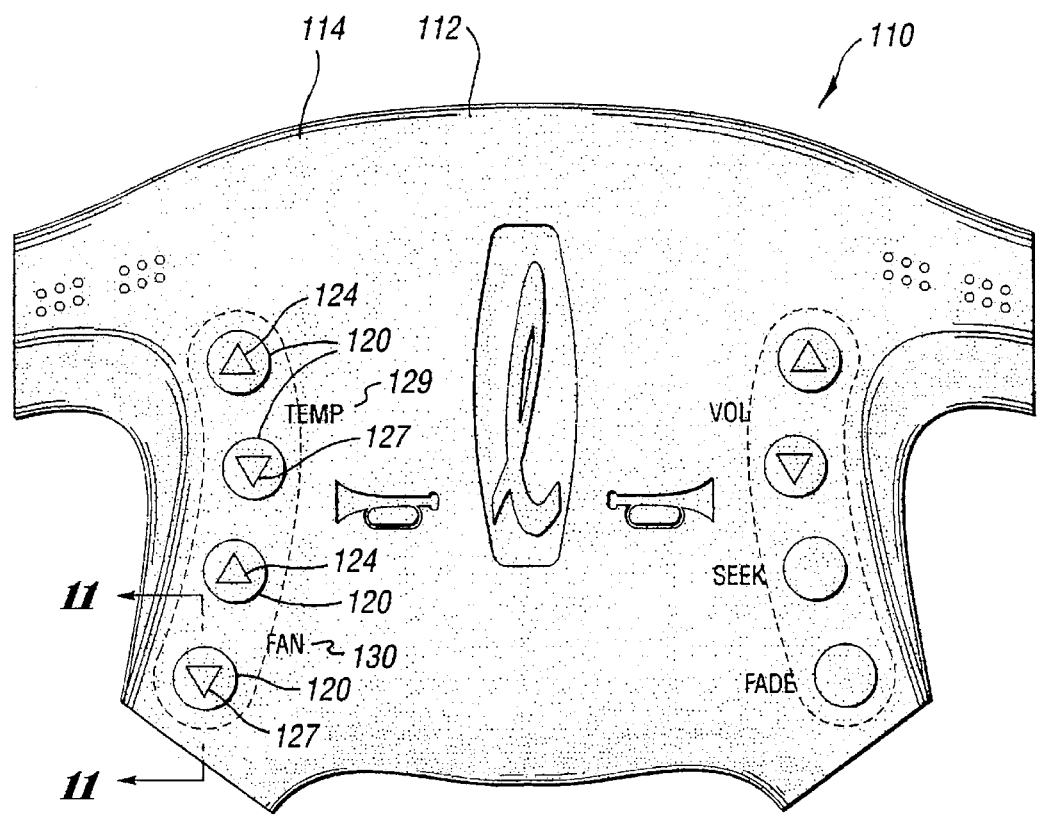
FIG. 10 is a front elevational view of a second air bag cover constructed in accordance with the present invention.
Figure 11:
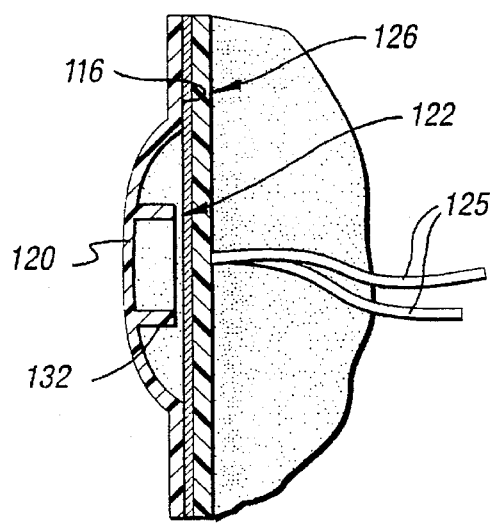
FIG. 11 is a view, partially broken away and in cross-section, taken along lines 11—11 in FIG. 10.
Figure 12:
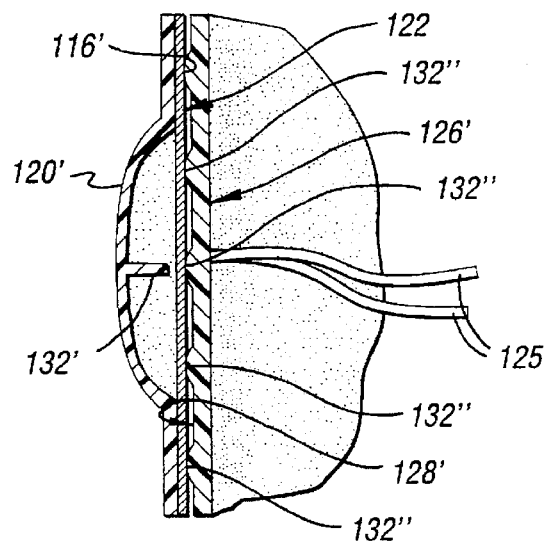
FIG. 12 is a view, similar to FIG. 11, illustrating another embodiment of the invention wherein both the inside surface of the cover and the upper surface of the back plate have switch-activating members formed thereon.

Referring now to FIGS. 10–12, there is illustrated another embodiment of an automotive air bag cover, generally indicated at 110, constructed in accordance with the present invention. Typically, the automotive air bag cover 110 is also adapted to be secured at the top end of the vehicle drive column (not shown) at the steering wheel of the vehicle. The air bag cover 110 is also preferably relatively flexible and is formed by injection molding with a thermoplastic such as Santoprene®. One form of the air bag cover 110 is described in detail in the above-noted application Ser. No. 08/451,458 entitled "Thermoplastic Air Bag Cover Having A Domed Front Panel And Unitary Multifunctional Switching Module".

Similar to the air bag cover 10, the air bag cover 110 includes a front panel 112 overlying an undeployed air bag (not shown). A front panel 112 has a front outer surface 114 and a rear inner surface 116. The front panel 112 is separable on a prescribed tear pattern (not shown).

The front panel 112 has a first plurality of raised domes 120 molded in a side portion of the front panel 112 which define a first set of switch activation mechanisms outside an area bordered by the tear pattern. Preferably, the raised domes 120 are relatively thin and on the order of 1–2.2 millimeters in thickness.

The cover 110 also includes a first unitary switching module, generally indicated at 122, lying behind the rear inner surface 116 in a first switch location area of the front panel 112. The switching module 122 has electrical leads 125. The switching module 122 has multiple functions as indicated by indicia in the form of up and down pointing triangles 124 and 127, respectively. Located adjacent thereto are indicia 129 and 130 formed on the front panel 112 which indicates the particular vehicle accessory to be controlled such as the automobile's climate control system including temperature control at 129 and circulating fan control at 130.

The first unitary switching module 122 may include a rigid insulative material such as an injection molded plastic with electrical circuitry having a metal stamping or the like embedded in the insulative material such as by insert molding. Alternatively, the electrical circuitry may comprise a thin electrically conductive leaf coated with a flexible electrically insulative coating such as a flexible plastic. The switching module 122 is also available from the Bergquist Company.

Switch activating members 132 and 132', as illustrated in FIGS. 11 and 12, are integrally formed at and project from their respective inner surfaces 116 and 116' at their respective raised domes 120 and 120'. The switch activating number 132 is shown illustrated as circle-shaped and the switch activating member 132', is illustrated as x-shaped, however, the members 132 and 132' may have other shapes as previously described.

There is illustrated in FIG. 11 a conventional back plate, generally indicated at 126, secured to the rear inner surface 116 of the front panel 112 in containing relationship to the switch 122.

A back plate, generally indicated at 126' in FIG. 12, has a set of switch activating members 132" formed on its upper surface 128' to further enhance activation of the switch 122 upon depression of the dome 120' and its associated Switch activating member 132'.

Figure 13:
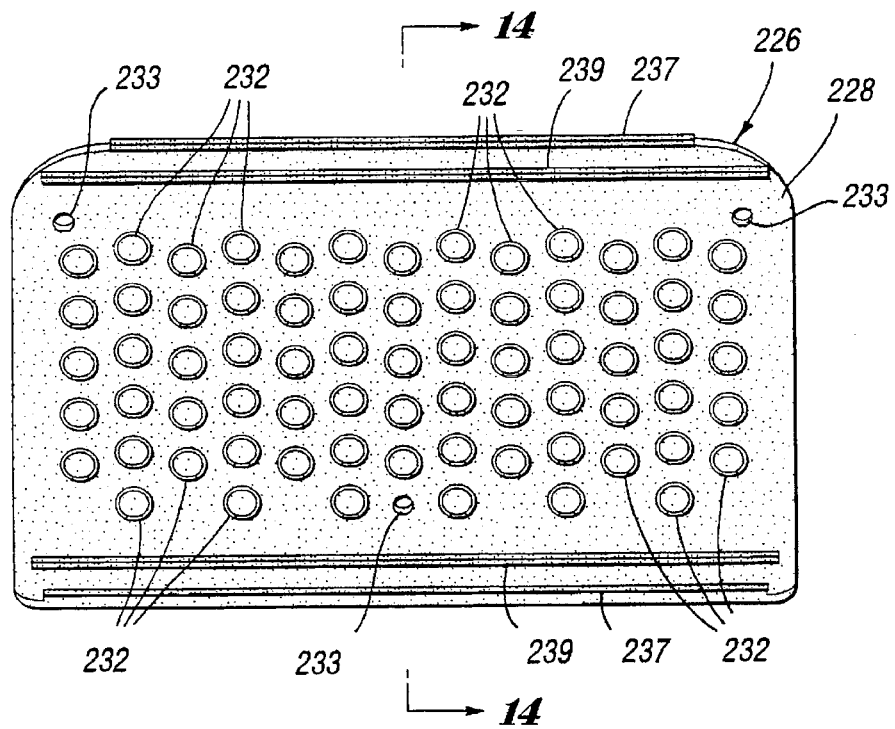
FIG. 13 is a top plan view of yet another embodiment of a back plate.
Figure 14:
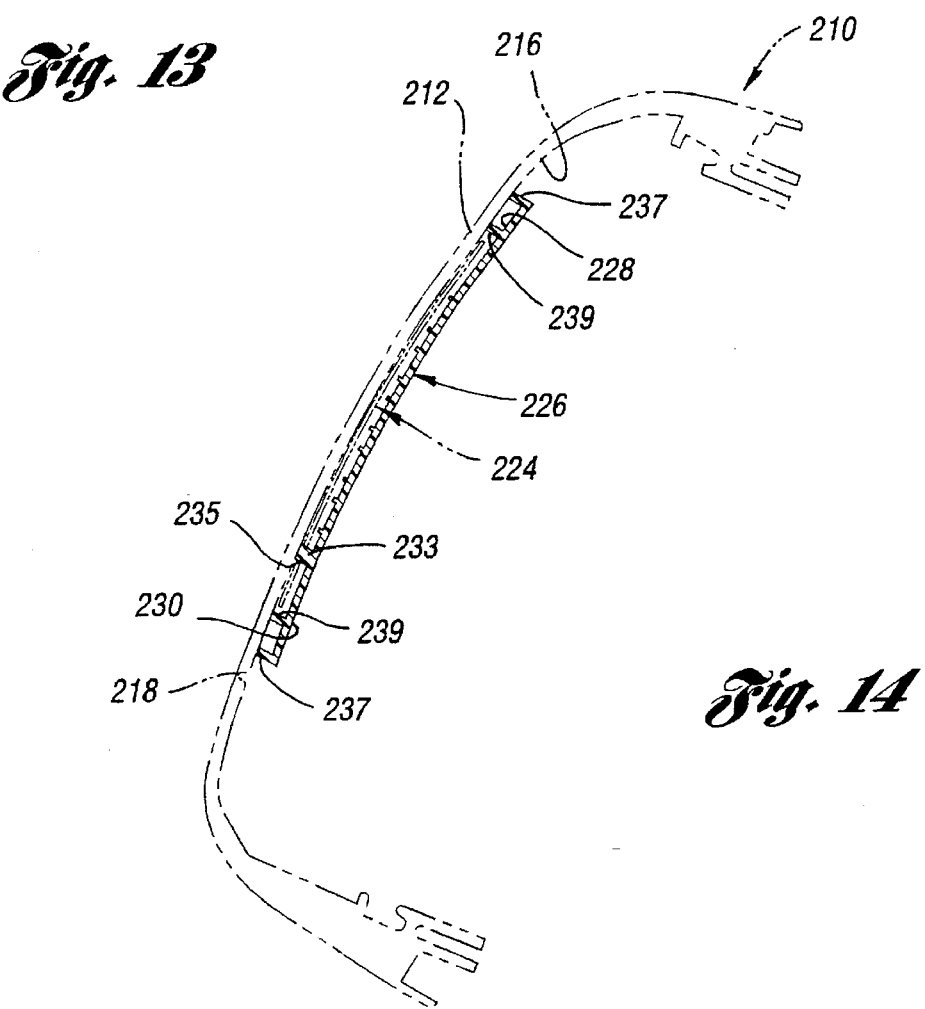
FIG. 14 is a sectional view taken along lines 14—14 in FIG. 13 with the rest of the air bag cover indicated by phantom lines.

Referring now to FIGS. 13 and 14, there is illustrated another embodiment of a back plate, generally indicated at 226. The back plate 226 has a top surface 228 and a bottom surface 230 and is secured to a rear inner surface 216 of a front panel 212 of an air bag cover 210, illustrated by phantom lines in FIG. 14. The front panel 212 is separable along a prescribed tear pattern 218.

The back plate 226 forms a hollow compartment for a membrane-type switch, generally indicated at 224. The back plate 226 has three, non-colinear, spaced stakes 233 integrally formed at and projecting from the top surface 228 which extend completely through apertures 235 (only one of which is shown in FIG. 14) formed in the switch 224 to align the switch 224 in its hollow compartment. Alternatively, the front panel 212 may have the stakes 233 formed at its rear inner surface 216. Switch activating members 232 in the form of small circles are integrally formed on the top surface 228 of the back plate 226 to enhance activation of the switch 224 as in the prior embodiments. As before, the members 232 may take other shapes.

The back plate 226 also includes integrally-formed outer rim portions 237 and inner rim portions 239 to facilitate thermal bonding of the back plate 226 at the rear inner surface 216 of the front panel 212. The switch 224 is positioned between inner rim portions 239 on the stakes 233.

While the best mode for carrying out the invention has been described in detail, those familiar with the art to which this invention relates will recognize various alternative designs and embodiments for practicing the invention as defined by the following claims.

What is claimed is:

1. A relatively flexible thermoplastic air bag cover comprising:

a front panel adapted to overlie an undeployed air bag, the front panel having a front outer surface and a rear inner surface and being separable along a prescribed tear pattern upon deployment of the air bag, the front panel having a switch location area;

a membrane switch lying behind the rear inner surface in the switch location area of the front panel and having a first plurality of spaced, individual switch activation locations spaced apart from one another in two mutually orthogonal directions;

a back plate having a top surface and a bottom surface and being secured to the rear inner surface of the front panel in containing relationship to the membrane switch and forming a hollow compartment for the membrane switch in the switch location area; and a second plurality of switch activating members spaced apart from one another in two mutually orthogonal directions and having distal end surfaces, the switch activating members being integrally formed at and projecting from the top surface of the back plate at the switch activation locations, wherein the membrane switch is activated by depression of the front panel at its front outer surface in the switch location area and wherein each of the switch activating members has a height and a width so that at least one of the switch activating members enhances activation of the membrane switch at its respective switch activation location wherein the membrane switch includes top and bottom surface layers and intermediate first and second conductive layers separated by an insulating layer having apertures formed completely therethrough and wherein the first plurality of spaced, individual switch activation locations are defined by a third plurality of raised domes integrally formed in at least one of the top and bottom surface layers adjacent the apertures in the insulating layer.

2. The air bag cover of claim 1 wherein the switch activity members have distal end surfaces and at least one of the distal end surfaces engages and depresses at least one of the raised domes upon depression of the front panel, the at least one depressed dome causing the first and second conductive layers to make electrical contact within a respective one of the apertures.

3. The air bag cover of claim 2 wherein the third plurality of raised domes are integrally formed in both the top and bottom surface layers of the membrane switch adjacent their respective apertures.

4. The air bag cover of claim 3 wherein the switch activation locations are uniformly spaced on the top and bottom surface layers of the membrane switch and the distal end surfaces of the switch activating members are sized so that each switch activating member is capable of engaging and depressing at least one of the raised domes at its respective distal end surface to cause the first and second conductive layers to make electrical contact within its respective aperture upon depression of the front panel.

5. The air bag cover of claim 4 wherein each of the distal end surfaces is X-shaped.

6. The air bag cover of claim 4 wherein each of the distal end surfaces is circle-shaped.

7. The air bag cover of claim 4 wherein each of the distal end surfaces is oblong-shaped.

8. The air bag cover of claim 4 wherein each of the distal end surfaces is annulus-shaped.

9. The air bag cover of claim 1 further comprising a plurality of stakes integrally formed at and projecting from one of the rear inner surface of the front panel and the top surface of the back plate and wherein the membrane switch has a plurality of apertures extending completely therethrough for receiving and retaining the stakes therein to align the membrane switch in the hollow compartment.

10. The air bag cover of claim 1 wherein each of the widths is greater than its respective height.

11. The air bag cover of claim 10 wherein each of the widths is greater than two times its respective height.

* * * * *